United States Patent [19]

Everett

[11] 4,107,009
[45] Aug. 15, 1978

[54] RECOVERY OF COPPER FROM ORES AND CONCENTRATES

[75] Inventor: Peter Kenneth Everett, Castlecrag, Australia

[73] Assignee: Dextec Metallurgical Proprietary Limited, Australia

[21] Appl. No.: 816,450

[22] Filed: Jul. 18, 1977

Related U.S. Application Data

[63] Continuation-in-part of Ser. No. 654,391, Feb. 2, 1976, Pat. No. 4,061,552.

[51] Int. Cl.$^2$ .................. C25C 1/12; C25B 1/04
[52] U.S. Cl. .................. 204/129; 204/107; 75/109; 75/117; 75/121; 423/140; 423/511; 423/633
[58] Field of Search .............. 204/107, 129; 423/511, 423/140, 633; 75/109, 117, 121

[56] References Cited

U.S. PATENT DOCUMENTS

| 3,673,061 | 6/1972 | Kruesi | 204/107 |
| 3,785,944 | 1/1974 | Atawood et al. | 204/107 |
| 3,923,616 | 12/1975 | Atadan et al. | 204/107 |

FOREIGN PATENT DOCUMENTS

54,656 10/1974 Australia.
46,913 3/1974 Australia.
56,990 12/1974 Australia.
52,833 12/1974 Australia.

*Primary Examiner*—R. L. Andrews
*Attorney, Agent, or Firm*—Edgar N. Jay

[57] ABSTRACT

A process for extracting copper from a copper bearing ore or concentrate which comprises immersing the ore or concentrate in an electrolyte, intimately mixing with the slurry so formed finely dispersed air or other oxygen-containing gas and maintaining the pH of the mixture at above 1.5 and below 7.0 throughout the process. Iron is solubilized in the process and precipitated as ferric oxide and the copper is taken into solution in which copper is primarily present as cuprous ions. The process is conducted at substantially atmospheric pressure and at temperatures of from 50° C to the boiling point of the electrolyte. The electrolyte is acidic and contains chloride ions in a concentration between that sufficient to maintain in solution cuprous ions present and saturation.

12 Claims, No Drawings

RECOVERY OF COPPER FROM ORES AND CONCENTRATES

CROSS REFERENCES

This application is a continuation-in-part of my co-pending application Ser. No. 654,391, filed Feb. 2, 1976, now U.S. Pat, No. 4,061,552 and assigned to the assignee of the present application.

BACKGROUND OF THE INVENTION

This invention relates to the dissolution and recovery of copper from copper and iron-bearing ores or concentrates particularly sulfide ores or concentrates. The invention allows at a low cost the substantially pollution-free production of copper metal at substantially atmospheric pressure in a single step.

A well known prior art treatment for copper-bearing ores, particularly sulfides, is the pyrometallurgical treatment of the ores. The pyrometallurgical treatment of sulfide ores is expensive, pollutes and requires the disposal of large quantities of sulfur dioxide or by-product sulphuric acid. To overcome the disadvantages of prior art pyrometallurgical processes, particularly pollution, a number of hydrometallurgical processes have been developed particularly aimed at the recovery of copper from ores containing chalcopyrite, malachite or azurite.

Chalcopyrtie (Cu Fe $S_2$) is one of the most common copper materials and also one of the more oxidation-resistant minerals, being reported as more noble or oxidation-resistant than pentlandite, cobaltite sphalerite, galena, chaleocite and pyrrhotite (least resistant) and less noble than pyrite and molybdenite.

Chalcopyrite may be oxidized according to the equations:

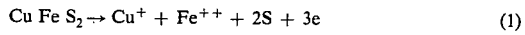

$$Cu\,Fe\,S_2 \rightarrow Cu^+ + Fe^{++} + 2S + 3e \quad (1)$$

or

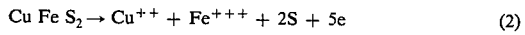

$$Cu\,Fe\,S_2 \rightarrow Cu^{++} + Fe^{+++} + 2S + 5e \quad (2)$$

depending on the degree to which the oxidation is taken. Due to the instability of sulfur in alkaline oxidizing solutions, such reactions must be carried out at a pH of less than about 7.

This may be accomplished in autoclaves using high pressure air or oxygen in a similar manner to that described in Canadian Pat. No. 618,623 (for zinc ores) (Sherritt Gordon Mines Ltd.), however, the plant and operating costs are extremely high.

Australian patent application 52833/73 (The Anaconda Co.) describes a process for the treatment with oxygen of copper sulfides in an ammoniacal solution in low-pressure autoclaves. The process is expensive, requires large amounts of ammonia, oxygen and a ready market for ammonium sulfate which is produced in quantities of five to ten times those of copper.

U.S. Pat. No. 3,673,061 (Cyprus Metallurgical Processes Corporation) describes the oxidation of copper sulfides at the anode of an electrochemical cell. The presence of iron in the ore results in a low anode current efficiency due to the power consumed by iron oxidation reactions, as is apparent from equations (1) and (2) above. From equation (1) it can be seen that a three electron exchange is necessary for the dissolution of one atom of copper while deposition would only require a one electron exchange thereby resulting in an anodic dissolution current efficiency of only 33% with respect to copper. To overcome this inefficiency, it is necessary to produce electrolytic iron in amounts similar to those of copper and thereby requiring an equivalent market for the iron product which is produced by a very expensive method. In addition, further care must be taken to avoid decreases in current efficiency due to further oxidation of elemental sulfur to sulfate. The process requires high anode current densities which result in increased anode wear and requires care in the electrolytic recovery of copper due to the high iron content of the electrolyte.

Australian patent application No. 54656/73 (Cyprus Metallurgical Processes Corporation) is very similar to the above patent and suffers from the same disadvantages.

Another Australian patent application No. 56990/73 (Hazen Research Inc.) discloses a process for the leaching of sulfide ores with ferric chloride which is regenerated anodically. The process requires a continuous electrolyte flow from the catholyte to the anoltye to avoid the severe reduction in current efficiency which would result from ferric ions reaching the cathode. There is also no provision for a method of overcoming the inefficiencies due to the presence of iron sulfides in the ore.

Australian patent application No. 46913/72 (Duval Corporation and corresponding to U.S. Pat. No. 3,785,944, Atwood et al, Jan. 15, 1974) describes a relatively complex cyclic process involving the ferric chloride and cupric chloride leaching of copper sulfide ores and the regeneration of ferric chloride with oxygen. U.S. Pat. No. 3,923,616 to Atadan, Dec. 2, 1975, also describes a cupric/ferric chloride leach process. Atadan is largely concerned with at least a two-stage process, in the first stage of which cupric chloride is reduced to cuprous chloride by reacting with unreacted chalcopyrite. Atadan also describes a final stage in which the ore, that is, the reacted ore of the first stage in a multistage process or unreacted ore in a single stage process, is subjected to an oxygen-bearing gas under pressure in a hot electrolyte containing an excess of chloride ions to produce cupric chloride (the thus-formed cupric chloride being fed back to the first stage). The requirement of a final oxidation at elevated pressure is generally attributed to the formation of an inert, adherent sulfur film on the ore or concentrate surface during initial treatment of the ore or concentrate with one or more strong oxidizers such as cupric chloride or ferric chloride. In such elevated pressure systems, it is not practical to use air as the source of oxygen because, among other things, of the need to vent large quantities of gas in which the oxygen concentration has been reduced below a useful level.

DESCRIPTION

The process of this invention overcomes the disadvantages of the above processes and allows the conversion of chalcopyrite to elemental sulfur, iron oxide and metallic copper, (in relatively iron-free solutions), at atmospheric pressure, without requiring the production of electrolytic iron, or without requiring the use of a gas which is substantially oxygen.

The major difference between this invention and the prior art is the discovery of a method of oxidizing copper-bearing ores or concentrates, even ores containing chalcopyrite, with air at substantially atmospheric pressure and moderate temperatures (50° to 105° C) to produce ferric oxide, and, in the case of sulfide ores or concentrates, to convert sulfide sulfur to elemental form and take the copper into solution. In this process, the dominant equation for the oxidation of the copper in chalcopyrite can be represented as follows:

$$2\,CuFeS_2 + 2H^+ + 2O_2 \rightarrow 2Cu^+ + Fe_2O_3 + 4S + H_2O \tag{3}$$

The major portion of the copper in the chalcopyrite is converted to cuprous ion in the present process, however, some further oxidation of cuprous to cupric may occur as follows:

$$2\,Cu^+ + \tfrac{1}{2}O_2 + 2H^+ \rightarrow 2Cu^{++} + H_2O \tag{4}$$

The amount of cupric ions present in the electrolyte is such that interference with the reaction of Equation 3 from the formation of sulfur film on the ore or concentrate is avoided.

Broadly in accordance with the present invention there is provided a process for extracting copper from a copper and iron-bearing ore or concentrate which comprises immersing the ore or concentrate in an electrolyte, intimately mixing with the slurry so formed finely dispersed air or other oxygen-bearing gas at substantially atmospheric pressure and at temperatures of from 50° to the boiling point of the electrolyte, the said electrolyte being acidic and containing chloride ions in a concentration between that sufficient to maintain in solution the cuprous ions present and saturation, and maintaining the pH of the mixture at above 1.5 and below 7.0 throughout the process, whereby iron solubilized in the process is precipitated as ferric oxide, and in the case of a sulfide ore or concentrate sulfide sulfur oxidizable under the conditions is substantially converted to elemental form and the cooper is taken into solution.

One of the major advantages of the process of the present invention is that it can be operated under atmospheric pressure and consequently pressurized vessels do not have to be used. Accordingly, the term "substantially atmospheric pressure" as used in this specification and claims means pressures other than pressures for which pressurized vessels are required.

In one form of the invention, hydrochloric acid is continuously or intermittently added to maintain the pH at the specified level, and the copper is converted to ionic form in solution from which it may be obtained in elemental form by methods known per se such as by cementation or electrolytic deposition.

Alternatively, the pH may be controlled by the continuous or intermittent addition of acid anolyte from an electrochemical cell. The hydrogen ions in the anolyte are formed by the anodic oxidation of water and can be conveniently regenerated by return of the electrolyte to the cell for the precipitation of copper at the cathode and production of more hydrogen ions by oxidation of water at the anode. A preferred form of the invention is carried out by intimately mixing the ore or concentrate with air or oxygen-containing gas in the anode compartment of an electrochemical cell, and the copper can be continuously plated out at the cathode.

Accordingly in another form of the invention, there is provided a process for extracting copper from a copper and iron-bearing ore or concentrate and concomitantly plating out the extracted copper at the cathode of an electrochemical diaphragm cell which comprises immersing the ore or concentrate in an electrolyte in the anode compartment of the electrochemical diaphragm cell, intimately mixing the slurry so formed wih finely dispersed air or other oxygen-bearing gas at substantially atmospheric pressure and at temperatures of from 50° C to the boiling point of the electrolyte, the said electrolyte containing chloride ions in a concentration between that sufficient to maintain in solution any cuprous ions present and saturation, and passing current between the anode and cathode at a rate such that the hydrogen ions liberated at the anode maintain a pH of between 1.5 and 7.0 in the electrolyte, whereby the iron solubilized in the process is precipitated as ferric oxide, and in the case of a sulfide ore or concentrate sulfide sulfur oxidizable under the conditions is substantially converted to elemental form, and the copper is plated out on the cathode.

The processes of this invention can be catalysed at the start of the process by adding copper ions to the electrolyte.

Preferably the stream of air or oxygen-bearing gas is introduced into the electrolyte in finely divided form. For best results, the gas stream should be finely divided enough to accelerate the reaction forming ionic copper, ferric oxide and elemental sulfur. For that purpose, a porous diffuser is used formed of any suitable material but having sufficiently small diameter pores, preferably less than about 0.02 inch. Good results were obtained using a diffuser made of porous graphite having an average pore diameter of about 0.005 inch.

The solubilized iron content of the electrolyte is preferably kept below 5 g.p.l. by control of the electrolyte oxidation potential.

The development of the process in relation to sulfide-bearing ores resulted from a number of considerations:

Base metal sulfides tend to passivate during oxidation reactions much more readily in sulfate solutions than in chloride solutions, and hence chloride solutions are used in the process of this invention. A further reason for this preference is that copper sulfides, particularly flotation concentrates froth vigorously on the introduction of air in sulfate solutions, with negligible frothing of most copper materials in chloride solutions. The chloride concentration used in the present invention is that sufficient to solubilize cuprous ions present and saturation (see Equation 1).

Air is the cheapest and most readily available oxidizing agent.

Elemental sulfur is a more desirable by-product than ammonium sulfate as large amounts of ammonia, and a large market for ammonium sulfate are not required. Due to the instability of elemental sulfur in alkaline oxidizing solutions, a reaction pH of less than 7 is required. Iron oxide is a more desirable by-product than electrolytic iron due to the costs involved in production of the latter and the necessity of marketing equivalent quantities of copper and electrolytic iron, and therefore, a reaction pH above 1.5 is necessary for the stability of the iron oxide product.

As can be seen from Equation 3, the process of the present invention oxidizes the iron to a ferric oxide end product. This process does not leave appreciable amounts of ionic iron in solution with its attendant undesired effects on copper recovery.

Oxygen reactions in acid solution can be quite slow due to the kinetics involved. The $2H^+ + 0.5O_2 \rightarrow H_2O$ reaction has potentials of 1.229 volts in acid and 0.815 volts in neutral solution. In acid solution the reactions often involve slow rate determining steps such as the initial reduction of oxygen to peroxide. The air oxidation of ferrous ion to ferric ion in acid solution, contrary to the above potentials, proceeds only slowly. However, the reaction may proceed rapidly in low acid solutions when it involves the simultaneous precipitation of ferric oxide or hydroxide.

While it is not intended to be limited thereby, at the present time it is believed that the mechanism by which the chalcopyrite is dissolved in accordance with the present invention to avoid the formation of the unwanted, reaction-retarding sulfur film, is based upon the formation of an intermediate sulfur compound which allows diffusion of sulfur, in one form or another, away from the surface of the chalcopyrite before its conversion to elemental sulfur. The equation which seems to fit best to the present understanding of the reaction is

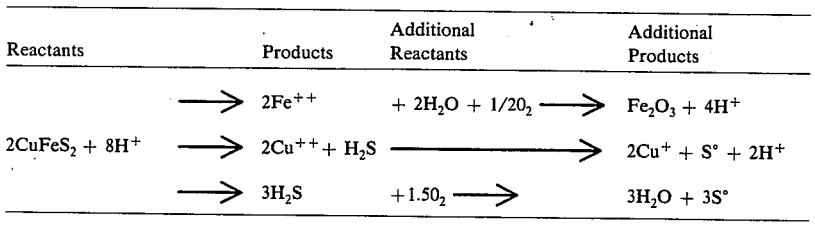

The above mechanism explains why the oxidation potential (and hence the $Cu^{++}/Cu^+$ ratio) is maintained at a level low enough for the existance of the intermediate sulfur compounds to transport the sulfur from the surface of the chalcopyrite. This also allows the transport of the ionic iron away from the chalcopyrite surface before its precipitation as iron oxide.

The following examples illustrate the air oxidation of chalcopyrite at substantially atmospheric pressure to form ferric oxide, elemental sulfur and ionic copper:

EXAMPLE I

One hundred grams of a chalcopyrite concentrate were agitated with one liter of electrolyte containing 200 g.p.l. of ammonium chloride and 2 g.p.l. of ionic copper in a beaker fitted with a porous graphite diffuser, having an average pore diameter of about 0.005 inch, covering the bottom.

Ninety mls of 5 Normal Hydrochloric acid were added slowly over a period of six hours to maintain a pH range of 2.0–2.5. The temperature was maintained at 85° C and air was admitted through the diffuser.

| Time (Hours) | RESULTS Solution Analyses (g.p.l.) | |
|---|---|---|
| | Cu | Fe |
| 0 | 2.2 | 0.01 |
| 1 | 10.4 | 1.8 |
| 2 | 16.8 | 2.0 |
| 3 | 20.2 | 1.4 |
| 4 | 23.6 | 0.8 |
| 5 | 25.6 | 0.7 |
| 6 | 26.8 | 0.2 |
| Solids Analyses % | Copper | Iron | Elemental Sulfur |
|---|---|---|---|
| Copper Concentrate | 26.2 | 28.6 | — |
| Residue | 2.54 | 31.8 | 31.5 |

In excess of 90% of the copper was leached with a maximum electrolyte iron content of 2 g.p.l.

Similar results have been achieved with sodium, magnesium, zinc and manganese chloride electrolytes.

The air oxidation of chalcopyrite is ideally carried out at a pH of approximately 2.0–2.5 as shown in the following example.

EXAMPLE II

Three slurries of Chalcopyrite concentrate (100 g.p.l.) in 20% sodium chloride solution were maintained respectively in the pH ranges of 1–1.5, 2–2.5, 3–3.5 at 85° C in a beaker similar to that in Example I, while finely dispersed air was added through the porous cloth diffuser covering the bottom of the beaker.

| pH Range: | RESULTS 1–1.5 | | 2–2.5 | | 3–3.5 | |
|---|---|---|---|---|---|---|
| Time | Cu | Fe | Cu | Fe | Cu | Fe |
| 1 hr | 8.2 | 7.0 | 9.5 | 2.2 | 3.5 | 0.01 |
| 2 hrs | 12.8 | 11.5 | 14.2 | 1.8 | 5.5 | 0.02 |
| 4 hrs | 18.5 | 15.5 | 21.5 | 2.0 | 7.8 | 0.04 |
| 6 hrs | 20.0 | 18.0 | 23.0 | 0.6 | 9.5 | 0.03 |

The fastest rate of dissolution of copper occurred in the 2–2.5 pH range and the solution iron concentration was suitably low.

The oxidation is ideally carried out at a temperature in excess of approximately 70° C as indicated in the following example.

EXAMPLE III

Three slurries of chalcopyrite concentrate (100 g.p.l.) in 20% sodium chloride solution were maintained at pH 2.0–2.5 in a beaker similar to that in Example I and at temperatures of 70°, 80° and 90° C while finely dispersed air was admitted in a similar manner to Example I.

| Temp. °C | RESULTS (g.p.l.) 70° | | 80° | | 90° | |
|---|---|---|---|---|---|---|
| Time | Cu | Fe | Cu | Fe | Cu | Fe |
| 1 hr | 7.5 | 1.5 | 9.0 | 2.2 | 9.2 | 2.0 |
| 2 hrs | 13.0 | 1.4 | 14.4 | 1.6 | 15.0 | 2.8 |
| 4 hrs | 18.2 | 2.2 | 22.8 | 1.4 | 22.0 | 2.0 |
| 6 hrs | 20.2 | 1.1 | 24.5 | 0.8 | 24.7 | 1.6 |

A temperature of approximately 80° is preferred.

The use of chalcopyrite in the examples described is because it is one of the most common of the sulfide ores of copper, is reported to be the most noble and difficult to decompose of the sulfides of copper, and creates severe treatment problems due to the large amounts of chemically bound iron. In general, other sulfides of copper are more easily treated by this process than chalcopyrite.

To avoid unnecessary repetition, portions of said copending application Ser. No. 654,391 have been omitted from the present application, but all of said application Ser. No. 654,391 is incorporated here by reference thereto.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What I claim is:

1. A process for extracting copper from a copper and iron-bearing ore or concentrate which comprises forming a slurry of the ore or concentrate with an electrolyte, intimately mixing finely dispersed oxygen-bearing gas with the slurry and maintaining the slurry and the mixture at substantially atmospheric pressure throughout the process and at a temperature of from 50° C to the boiling point of the electrolyte, said electrolyte being acidic and containing chloride ions in a concentration between that sufficient to maintain in solution a major portion of the dissolved copper as cuprous ions and saturation, and maintaining the pH of the mixture at above 1.5 and less than 7.0 throughout the process, whereby iron solubilized in the process is substantially simultaneously precipitated as ferric oxide and sulfide sulfur oxidized under the conditions is substantially converted to elemental form and the copper is taken into solution.

2. A process as claimed in claim 1 in which the solubilized iron content in the electrolyte is kept below 5 g.p.l. by control of the electrolyte oxidation potential.

3. A process as claimed in claim 2 in which the pH is maintained between about 2.0 to 2.5.

4. A process as claimed in claim 3 in which the temperature of the mixture is about 70° to 90° C.

5. A process as claimed in claim 2 wherein the copper and iron bearing ore or concentrate contains chalcopyrite.

6. A process as claimed in claim 2 wherein a pulsating stream of air or oxygen bearing gas is introduced into the electrolyte.

7. A process as claimed in claim 2 wherein the air or oxygen bearing gas is introduced through porous graphite.

8. A process as claimed in claim 2 in which at the start of the process copper ions are added to the electrolyte to act as a catalyst.

9. A process as claimed in claim 1 wherein the pH is maintained above 1.5 and less than 7.0 by the continuous or intermittent addition of hydrochloric acid.

10. A process as claimed in claim 9 including the further step of obtaining the copper in elemental form by replacement with iron.

11. A process as claimed in claim 1 wherein the pH is maintained at the specified level by forming hydrogen ions by the anodic oxidation of water.

12. A process as claimed in claim 1 in which the concentration of cupric ions in the electrolyte is maintained low enough to prevent the formation of an interfering sulfur film on the ore or concentrate.

* * * * *

UNITED STATES PATENT OFFICE
CERTIFICATE OF CORRECTION

PATENT NO. : 4,107,009
DATED : August 15, 1978
INVENTOR(S) : Peter Kenneth Everett It is certified that error appears in the above-identified patent and that said Letters Patent are hereby corrected as shown below:

Item [56], References Cited, under U.S. PATENT DOCUMENTS, for "Atawood et al" read -- Atwood et al -- and under FOREIGN PATENT DOCUMENTS, after "52,833 12/1974 Australia." insert -- 618,623 4/1961 Canada --

Col. 1, line 28, for "Chalcopyrtie" read -- Chalcopyrite --

Col. 3, line 35, for "cooper" read -- copper --

Col. 5, line 31, for "existance" read -- existence --

Signed and Sealed this

Thirty-first Day of July 1979

[SEAL]

Attest:

Attesting Officer

LUTRELLE F. PARKER
*Acting Commissioner of Patents and Trademarks*